Feb. 24, 1925.
F. A. HAIGH
1,527,643
SYSTEM OF ELECTRIC SHIP PROPULSION
Filed July 17, 1923
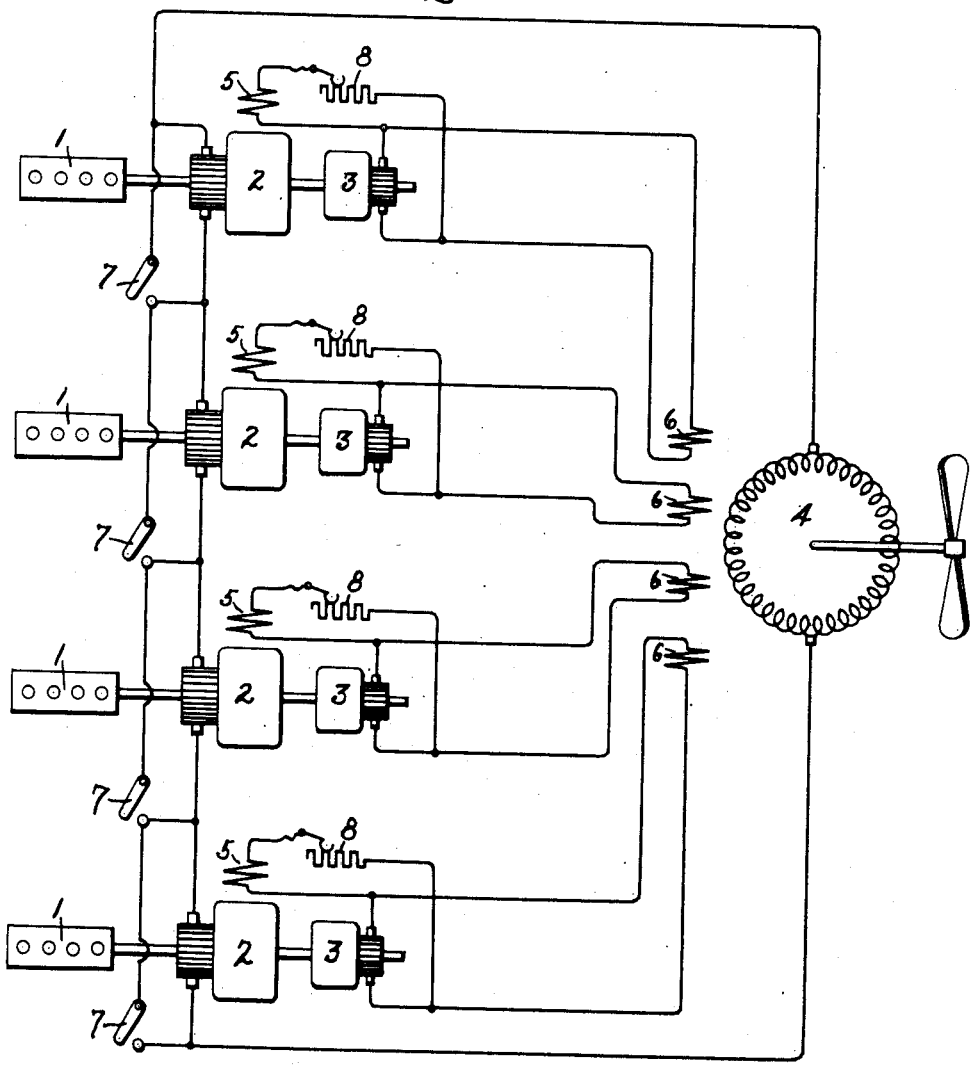
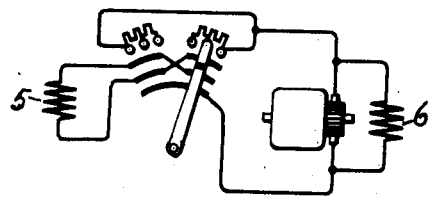
Inventor:
Frederick A. Haigh,
by
His Attorney.

Patented Feb. 24, 1925.

1,527,643

UNITED STATES PATENT OFFICE.

FREDERICK A. HAIGH, OF RUGBY, ENGLAND, ASSIGNOR TO GENERAL ELECTRIC COMPANY, A CORPORATION OF NEW YORK.

SYSTEM OF ELECTRIC SHIP PROPULSION.

Application filed July 17, 1923. Serial No. 652,196.

*To all whom it may concern:*

Be it known that I, FREDERICK A. HAIGH, a subject of the British Empire, residing at Rugby, in the county of Warwick, England, have invented certain new and useful Improvements in Systems of Electric Ship Propulsion, of which the following is a specification.

My invention relates to systems of electric ship propulsion and more particularly to systems in which a number of generators driven by independent internal combustion engines supply current to a motor on the propeller shaft. In such systems it is necessary to provide means for preventing the reversal of rotation of one of the generators should the engine driving it fail for any reason to maintain the necessary driving torque, as for example by the failure of the fuel supply or the sticking of the valves.

The object of the present invention is to provide means for automatically preventing the reversal of the direction of rotation of the generator in the event of the failure of an engine, and at the same time automatically decreasing the field of the propeller driving motor so as to reduce its field strength and thereby compensate for the drop in voltage at its terminals. The invention consists in exciting the fields of each generator from a self or separately excited exciter mounted on, coupled to or driven from the generator shaft, so that any decrease of speed of the generator itself will automatically weaken its field.

The invention further consists in dividing the field of the propeller motor into a number of sections corresponding to the number of generators and exciting each section of the propeller motor field from the exciter of one of the generators or from the generator armature voltage, so that in the event of one of the generators failing, a corresponding section of the motor field is automatically weakened or cut out and the total field strength of the motor thereby reduced.

In carrying this invention into effect, I may provide four generators each driven by a separate internal combustion engine, these generators being connected in series and supplying current to a motor mounted on the propeller shaft. In the event of failure of one of the engines, the tendency would be for the remaining three generators to drive current through the generator connected to the engine which has failed to maintain its torque. This will first of all tend to stall or bring to rest the defective generator set and will then tend to reverse its direction of rotation and drive it in the opposite direction, thereby driving the engine in the wrong direction. This might cause serious damage to the installation and to prevent it I provide an exciting machine either mounted on or driven by the shaft of each generator instead of as is the usual practice, exciting all the generators from a single exciter.

In such an arrangement in the event of a failure of one of the engines, the field strength and consequently the torque of the corresponding generator would fall rapidly with the speed and there would be no torque available to reverse the rotation of the set.

The reduction in the voltage available for the motor would result in a reduction of the motor speed and, since the power absorbed by a propeller falls more rapidly than the speed, the current in the system would be reduced and the remaining engines would be unable to deliver their full power to the propeller. By dividing the motor field into sections each dependent on the excitation of one of the generators, the total resultant motor field would be weakened as the voltage available for the motor armature was reduced, and the motor speed could thus be maintained at approximately the value required to utilize the power available. In such an arrangement in the event of failure of one of the engines, the exciter of the generator driven thereby automatically fails to supply current to the field of the generator, so that it is not possible for this machine to reverse and run as a motor driving the prime mover.

With this generator cut out of circuit, however, the voltage supplied to the propeller motor would drop considerably and thereby reduce the speed of the propeller. In order to prevent this, I divide the field of the motor into four sections, each section being supplied with current from the exciter of one of the generators. On failure of one of the prime movers the exciter driven thereby fails to supply current to the section of the field usually supplied by it. This automatically weakens the total field of the motor and tends to raise its speed, thereby compensating for the drop in voltage caused by one of the generators having been put out of action.

My invention will be better understood upon reference to the following description taken in connection with the accompanying drawings and its scope will be pointed out by the appended claims.

Referring now to the drawing, Fig. 1 shows a system in which my invention has been embodied and Fig. 2 shows a reversing rheostat suitable for use in the field circuit of the generators.

Fig. 1 shows a plurality of prime movers 1 each arranged to drive a different direct current generator 2 and exciting machine 3 mounted on the generator shaft, a circuit being provided for connecting the generators 2 in series with a propeller motor 4. Each exciting machine 3 is arranged to supply current to the field winding 5 of the corresponding generator and to a section 6 of the propeller motor field winding. Switches 7 may be provided for short-circuiting a motor 2 when it is not in use. The field circuit of each motor 2 is shown as provided with an adjustable rheostat 8. In order to permit operation of the motor 4 in both directions by Ward Leonard control each rheostat 8 may be replaced by a reversing rheostat of the type shown in Fig. 2.

What I claim as new and desire to secure by Letters Patent of the United States, is,—

1. A system of electric ship propulsion wherein a plurality of direct current generators driven by different prime movers and supplied with current from separate exciting machines are arranged to supply current to a propeller motor provided with a shunt field winding, characterized by the fact that said shunt field winding is divided into sections supplied with current from different exciting machines whereby the field strength of said motor may be controlled in response to the number of exciting machines in operation.

2. A system of electric ship propulsion comprising a plurality of direct current generators, an exciting machine mounted on the shaft of each generator, and a propeller motor arranged to be supplied with current from said generators, said motor being provided with a shunt field winding divided into sections conductively related to different exciting machines.

3. A system of electric ship propulsion comprising a plurality of direct current generators, a prime mover for driving each generator, an exciting machine mounted on the shaft of each generator and arranged to supply current to the field winding of one of said generators, and a propeller motor connected in series with said generators and provided with a shunt field winding divided into a number of sections equal to the number of said generators, the arrangement being such that each section is supplied with current from a different exciting machine.

4. A ship propulsion system wherein a plurality of series-connected generators each having an exciting machine mounted on its shaft are arranged to supply current to a propeller motor and wherein a different prime mover is provided for driving each of said generators, characterized by the fact that said generators are supplied with excitation from the exciting machines mounted on their respective shafts, whereby each generator is enabled to operate at reduced torque upon a decrease in the speed and torque of its prime mover.

5. A ship propulsion system wherein a plurality of series-connected generators are arranged to supply current to a propeller motor and wherein a different prime mover is provided for driving each of said generators, comprising a different exciting machine for supplying excitation to each of said generators, each exciting machine being arranged to rotate at a speed proportional to the speed of the generator to which it supplies exciting current.

In witness whereof, I have hereunto set my hand this twenty-sixth day of June, 1923.

FREDERICK A. HAIGH.

Witnesses:
J. A. FOSTER,
DOROTHY WHITE.